March 26, 1929.   M. L. MARTUS ET AL   1,706,895
PRIMARY BATTERY
Filed Aug. 28, 1925
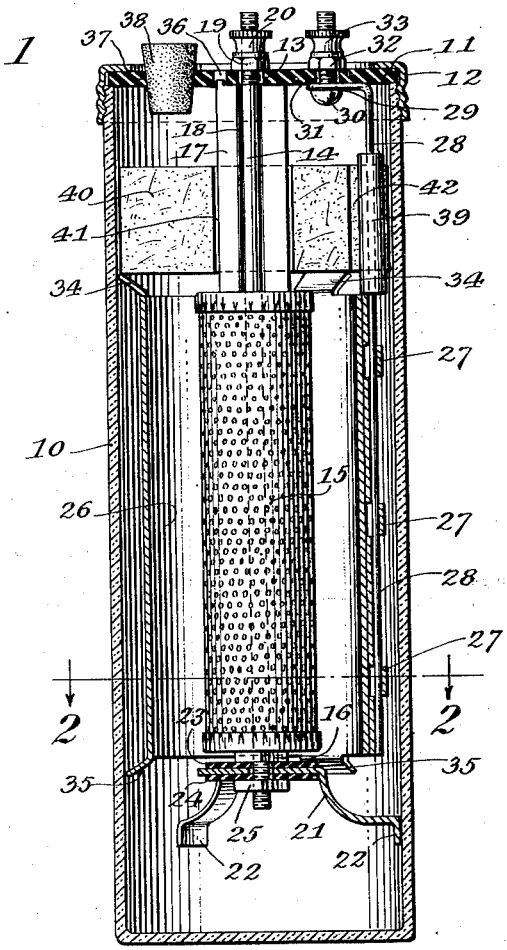
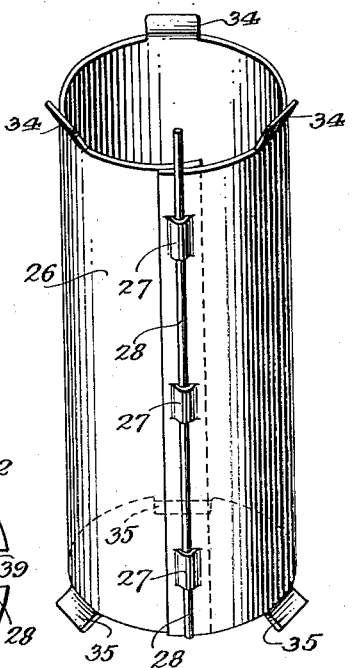
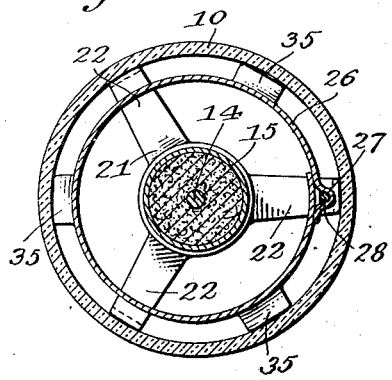
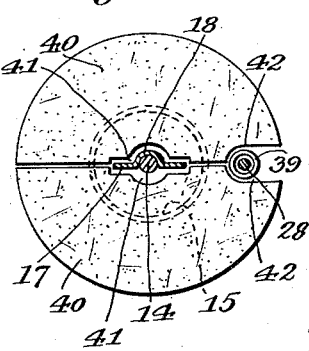
INVENTORS
Martin L. Martus,
Edmund H. Becker, and
James G. Ross
BY Chamberlain & Newman
ATTORNEYS.

Patented Mar. 26, 1929.

1,706,895

UNITED STATES PATENT OFFICE.

MARTIN L. MARTUS, OF WOODBURY, AND EDMUND H. BECKER AND JAMES G. ROSS, OF WATERBURY, CONNECTICUT.

PRIMARY BATTERY.

Application filed August 28, 1925. Serial No. 53,034.

The present invention relates to an improved primary battery, and has for an object to provide a battery unit of this character adapted particularly for radio or filament lighting, and in which the electrode elements will be supported from the battery jar cover, so as to constitute a removable unit with said cover, and further to be supported within the jar in a manner as to be entirely spaced from each other and independently mounted, preventing internal short circuits. A further object is to provide self-centering means for the respective electrode elements, to the end that they will be firmly supported within the jar, and effectually spaced from each other during movement of the jar or vibration and shock imposed thereon.

A still further object is to provide an improved spacing means for spacing the negative electrode element from the cover, and which further acts as a positioning means for the solid cake of caustic soda, or the like, for forming electrolyte by the addition of water, and which is placed in the battery preparatory to its use.

A particular object of the invention is to provide an improved form of positive or zinc electrode element, formed from sheet metal rolled into cylindrical form and interlocked with the supporting hanger, and further to provide such an electrode having integral centering means adapted to space it from the jar and firmly support it.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a vertical sectional view of the battery, according to the present embodiment of the invention;

Fig. 2 is a horrizontal sectional view, taken along the line 2—2 of Fig. 1;

Fig. 3 is a perspective view of the positive zinc electrode;

Fig. 4 is a transverse sectional view of the hangers for the electrodes, and showing the caustic soda cakes in plan.

Similar reference characters indicate corresponding parts throughout the several figures of the drawings.

Referring to the drawings, the battery unit, according to the present embodiment of the invention, comprises a cylindrical glass jar 10, having a cover plate 11 of hard rubber, or the like, secured thereon by a flanged screw ring 12, and provided with a central aperture 13 in which there is engaged the upper threaded end of a central hanger rod 14, upon which a cylindrical perforated basket 15 is supported by a nut 16 screwed upon its lower threaded end. A spacer web member 17 having a central longitudinal semi-circular cross-section groove 18 therein is soldered to the rod between the basket and the cover and the rod is secured to the cover by a nut 19 screwed upon its upper projecting end, a binding nut 20 being also screwed upon said end.

The basket 15 contains a suitable negative electrode substance, as copper oxide scale, and forms the negative electrode element of the battery.

Upon the lower end of the rod 14 there is provided a centrally perforated spider 21 including downwardly and outwardly bent spring arms, flanged at their ends, as at 22, to yieldably engage the inner wall of the jar, and secured upon the rod between insulation washers 23 and 24 by a retaining nut 25.

The positive element 26, of sheet zinc, is bent into cylindrical form with its edges overlapped, the overlying edge portion being provided in inwardly spaced relation to the edge with vertically aligned outwardly pressed loop portions 27, in which is engaged a vertical hanger and conductor wire 28 extending the length of the element and extending upwardly to the cover where it is provided with a bent loop 29 secured by a headed screw 30 engaged upwardly through an aperture 31 in the cover, and having a nut 32 engaged thereon at the upper side of the cover. A binding nut 33 is also engaged upon the screw 30.

The zinc element is further provided at its upper and lower edges with spaced outwardly bent integral lugs 34 and 35 adapted to engage the inner wall of the jar to center the element, the engagement being yieldable to provide a snug firm fit, inasmuch as the overlapped edges of the element are unattached and permit of slight contraction and expansion of the cylinder through the inherent resiliency of the metal.

The cover is further provided with a vent opening 36 and an aperture 37 having a removable stopper 38 of rubber or the like inserted therein, which normally seals the jar substantially air-tight and can be conveniently removed for the purpose of placing water in the jar, as will hereinafter more fully appear.

A rubber tube 39 is placed upon the wire 28 above the zinc electrode, for the purpose of protecting it from the solid cake of electrolyte material placed in the jar preparatory to use of the battery, and as will presently more fully appear.

According to our invention the two electrode elements of the battery are supported independently of each other, with no connection between them to form short circuits or bridges, the solid rubber cover 11 constituting both a support for supporting the elements as a unit and an insulation medium between the elements. The two elements are self-centered and firmly supported within the jar, and may be independently removed without disturbing their respective supporting means, so that renewal of either element may be conveniently made.

In order to enable the battery to be prepared for functioning merely by the addition of water, the same is provided with caustic soda, or the like, in cake from, the same being preferably provided as two semi-circular cakes 40 having a central groove 41 and an edge vertical groove 42 in their flat faces for engagement with the vertical electrode supports, the cakes being engaged at each side of the spacing web 17, which maintains them against rotation, and resting on the upper edge of the zinc element.

In order to start the battery to functioning it is only necessary to add water thereto up to the proper level through the opening 37, the soda cakes dissolving therein to form the electrolyte solution.

It will be understood that the invention is adaptable to use with other types of primary and secondary battery units, in which case the solution and materials of the elements may be changed as is well known.

We have illustrated and described a preferred and satisfactory embodiment of the invention, but it will be obvious that changes may be made therein, within the spirit and scope thereof as defined in the appended claims.

Having thus described our invention, what we claim and desire to secure by Letters Patent is:

1. In combination, a battery jar, a cover therefore, electrode elements in said jar including a central element and an expansible and contractible cylindrical element surrounding said central element in spaced relation, a central support for said central element depending from the cover, said cylindrical element comprising a metal sheet having its edges overlapped and in slidable engagement one with the other, a support for said cylindrical element depending from the cover, and integral means on said element slidably engaged by said support for securing said element thereto.

2. In combination, a battery jar, a cover therefore, electrode elements in said jar including a central element and a cylindrical element surrounding said central element in spaced relation, a central support for said central element depending from the cover, said cylindrical element comprising a metal sheet having its edges overlapped and in slidable engagement one with the other, a support for said cylindrical element depending from the cover, and spaced integral securing means on said element forming aligned vertical passages slidably engaged by said support for securing said element thereto.

3. In combination, a battery jar, a cover therefore, electrode elements in said jar including a central element and a cylindrical element surrounding said central element in spaced relation, a central support for said central element depending from the cover, said cylindrical element comprising a metal sheet having its edges overlapped and in slidable engagement one with the other, a wire support for said cylindrical element depending from the cover and extending substantially the length of said element, and integral means on said element engaged by said wire support for securing said element thereto.

4. In combination, a battery jar, a cover therefore, electrode elements in said jar including a central element and a cylindrical element surrounding said central element in spaced relation, a central support for said central element depending from the cover, said cylindrical element comprising a metal sheet having its edges overlapped and in slidable engagement one with the other, adapted to expand to contact with the jar, a support for said cylindrical element depending from the cover, and spaced integral loop portions pressed outwardly from said element forming aligned vertical passages engaged by said support for securing said element thereto.

5. In combination, a battery jar, a cover therefore, electrode elements in said jar including a central element and a cylindrical element surrounding said central element in spaced relation, a central support for said central element depending from said cover, a support for said cylindrical element depending from the cover, and integral centering means projecting from said cylindrical element adapted to engage the wall of the jar to center said element.

6. In combination, a battery jar, a cover therefore, electrode elements in said jar including a central element and a cylindrical element surrounding said central element in spaced relation, a central support for said central element depending from said cover, a support for said cylindrical element depending from the cover, and integral centering means projecting from said cylindrical element adated to engage the wall of the jar to center said element, said cylindrical element and said centering means being yieldable transversely whereby said centering means are resiliently engaged with said jar.

7. In combination, a battery jar, a cover therefore, electrode elements in said jar including a central element and a cylindrical element surrounding said central element depending from said cover, a support for said cylindrical element depending from the cover, and integral centering lugs projected from said cylindrical element in radially spaced relation at the upper and lower edges thereof adapted to engage the wall of the jar to center said element.

8. In combination, a battery jar, a cover therefore, electrode elements in said jar including a central element and a cylindrical element surrounding said central element in spaced relation, a central support for said central element depending from said cover, and integral centering means projecting from said cylindrical element adapted to engage the wall of said jar to center said element, the vertical edges of said cylindrical element overlapping and being unattached whereby said element is yieldable transversely and said centering means are resiliently engaged with said jar.

9. In combination, a container, a cover therefore, electrode elements in said container, depending from said cover, means for securing said cover to said container, solid electrolyte material supported above the active portion of the elements, said elements being centralized by themselves and each other by the contact with the container and the suspension from the cover.

10. In combination a container, a cover of non-conducting material, electrode elements supported from said cover and in insulative relation to each other, means for securing said cover to said container, solid electrode material above the active portion of the elements, said elements being centralized by themselves and each other by contact with the container and the suspension from the cover.

11. The combination of a container, a cover therefore, electrode elements in said container depending from said cover, both of the electrode elements being insulatively supported by said cover of nonconducting material at one extremity of the elements and insulatively supported at the other extremity by the container, and means insulatively connected therewith, solid electrolyte material supported above the active portion of the elements, said elements being centralized by themselves and each other by the contact with the container and the suspension from the cover.

12. In combination, a battery jar, a cover therefor, electrode elements arranged within the jar and in spaced concentric relation to each other, a central support for one of said elements depending from the cover, means carried by the lower end of said support and yieldably engaging the wall of the jar for centering said support, and integral centering means projecting from the upper and lower ends of the other electrode element and yieldably engaging the jar.

13. In combination, a battery jar, a cover therefor, electrode elements arranged within the jar in spaced concentric relation, a central support for one of said elements depending from the cover, a spacing member mounted on the support between the cover and said element, and a cake of electrolyte material supported above the active portions of said elements and surrounding said spacing member, and said member being designed to prevent rotation of the electrolyte material with relation thereto.

14. In combination, a container, a cover therefor, electrode elements disposed within the container and in spaced concentric relation, a central support for one of said elements depending from the cover, a separate support for the other element depending from the cover, a cake of electrolyte material mounted on the first mentioned support and arranged above the active portions of said electrode elements, said electrolyte material being grooved to receive the second mentioned support, and a sleeve of insulating material arranged on the last mentioned support and within said groove.

15. In combination, a container, a cover therefor, electrode elements disposed within the container and in spaced concentric relation, a central support for one of said elements depending from the cover, a spacing member mounted on the support between said element and cover, and including oppositely extended web portions, and a sectional cake of electrolyte material arranged about the spacing member and above the active portion of said elements, the confronting faces of said cake sections being designed to unitedly form grooves for the reception of the webs of said spacing member, whereby rotation of said sections is prevented.

16. In combination, a battery jar, a centrally apertured cover therefore, electrodes in said jar, a central support for one of said electrodes comprising a rod inserted through said electrode and extending upwardly through said aperture of the cover, means securing said rod to said electrode, means securing said rod to said cover, and a spacing member provided on said rod between said electrode and the underside of said cover and including radially disposed flat web portions extending longitudinally of said rod in opposed directions and at each side of the rod.

Signed at Waterbury, in the county of New Haven and State of Connecticut, this 20th day of August, A. D. 1925.

MARTIN L. MARTUS.
EDMUND H. BECKER.
JAMES G. ROSS.